United States Patent
Pedersen et al.

(10) Patent No.: US 11,632,950 B2
(45) Date of Patent: Apr. 25, 2023

(54) RFID SYSTEM FOR IDENTIFICATION OF CRYOGENIC STRAWS

(71) Applicant: VIKING GENETICS FMBA, Randers Drastrup (DK)

(72) Inventors: Gert Frølund Pedersen, Storvorde (DK); Jan Hvolgaard Mikkelsen, Støvring (DK)

(73) Assignee: Viking Genetics FMBA

( * ) Notice: Subject to any disclaimer, the term of this patent is extended or adjusted under 35 U.S.C. 154(b) by 0 days.

(21) Appl. No.: 16/064,572

(22) PCT Filed: Dec. 23, 2016

(86) PCT No.: PCT/EP2016/082514
§ 371 (c)(1),
(2) Date: Jun. 21, 2018

(87) PCT Pub. No.: WO2017/109153
PCT Pub. Date: Jun. 29, 2017

(65) Prior Publication Data
US 2019/0000073 A1   Jan. 3, 2019

(30) Foreign Application Priority Data
Dec. 23, 2015 (EP) .................................... 15202525

(51) Int. Cl.
*A01N 1/02* (2006.01)
*A61D 19/02* (2006.01)
(Continued)

(52) U.S. Cl.
CPC ......... *A01N 1/0268* (2013.01); *A61D 19/024* (2013.01); *B01L 3/502715* (2013.01);
(Continued)

(58) Field of Classification Search
CPC ...... A01N 1/0268; H01Q 1/40; H01Q 1/2225; G06K 19/07; G06K 19/0723;
(Continued)

(56) References Cited

U.S. PATENT DOCUMENTS 8,993,308 B2 * 3/2015 Zimmermann .......... A01N 1/02
435/286.1
2005/0247782 A1 * 11/2005 Ambartsoumian ..... B01L 3/545
235/385
(Continued)

FOREIGN PATENT DOCUMENTS

EP       2315163         4/2011
EP       2743865 A1      6/2014
(Continued)

OTHER PUBLICATIONS

O'Connor, "A U.K. biomedical technology company has developed an RFID tag that it says can transmit a signal while submerged in liquid nitrogen", RFID Journal, Tags in Deep Freeze, © 2004, 2 pages.
(Continued)

*Primary Examiner* — Michael L Hobbs
(74) *Attorney, Agent, or Firm* — Dinsmore & Shohl LLP

(57) ABSTRACT

The present disclosure relates to a radio-frequency identification system for a cryogenic straw comprising: at least one integrated circuit configured to store information and generate a radio-frequency signal in a frequency range of between 30 MHz and 3 GHz; and at least one antenna comprising a conductive thread configured to be integrated, such as molded, into a sidewall of the cryogenic straw. The disclosure further relates to a cryogenic straw comprising at least one antenna, the antenna comprising a conductive thread or rod, wherein the at least one antenna is integrated, such as molded, into a sidewall of the cryogenic straw.

17 Claims, 4 Drawing Sheets

(51) Int. Cl.
*B01L 3/00* (2006.01)
*G06K 19/07* (2006.01)
*H01Q 1/22* (2006.01)
*H01Q 1/40* (2006.01)

(52) U.S. Cl.
CPC .......... *G06K 19/07* (2013.01); *G06K 19/072* (2013.01); *G06K 19/0723* (2013.01); *G06K 19/0724* (2013.01); *H01Q 1/2225* (2013.01); *H01Q 1/40* (2013.01); *B01L 2300/022* (2013.01); *B01L 2300/0838* (2013.01); *B01L 2300/1894* (2013.01)

(58) Field of Classification Search
CPC .............. G06K 19/0724; G06K 19/072; B01L 3/502715; B01L 2300/0838; B01L 2300/1894; B01L 2300/022; A61D 19/024
See application file for complete search history.

(56) References Cited

U.S. PATENT DOCUMENTS

| | | |
|---|---|---|
| 2007/0075141 A1 | 4/2007 | Veitch et al. |
| 2008/0207259 A1 | 8/2008 | Rofougaran |
| 2008/0220507 A1 | 9/2008 | Clairaz et al. |
| 2011/0003279 A1* | 1/2011 | Patel ................. B82Y 15/00 435/5 |
| 2015/0205986 A1 | 7/2015 | Morris et al. |
| 2015/0379390 A1* | 12/2015 | Morris ............ G06K 19/07758 235/492 |

FOREIGN PATENT DOCUMENTS

| | | | |
|---|---|---|---|
| JP | 2007066011 | 3/2007 | |
| JP | 2008-197842 | 8/2008 | |
| JP | 2011-041201 A | 2/2011 | |
| JP | 2013-114587 | 6/2013 | |
| KR | 101093020 | 12/2011 | |
| WO | WO-2005109332 A1 * | 11/2005 | ............... A01N 1/02 |
| WO | WO 2013/061184 A1 | 5/2013 | |
| WO | WO2014/001819 A1 | 1/2014 | |
| WO | WO 2015/073964 | 5/2015 | |

OTHER PUBLICATIONS

Logistics & Information Technology, Chinese Economic Publishing House (English translation attached); Evidence 2; Jun. 1, 2008; 8 pages.
Medical Warehousing & Distribution Management Practices, Publishing House of Shanghai University of Finance and Economics (English translation attached); Evidence 1; Sep. 1, 2015; 5 pages.
Aubert, , RFID technology for human implant devices, Comptes Rendus Physique, vol. 12, Issue 7, 2011, pp. 675-683, ISSN 1631-0705, https://doi.org/10.1016/j.crhy.2011.06.004.

* cited by examiner

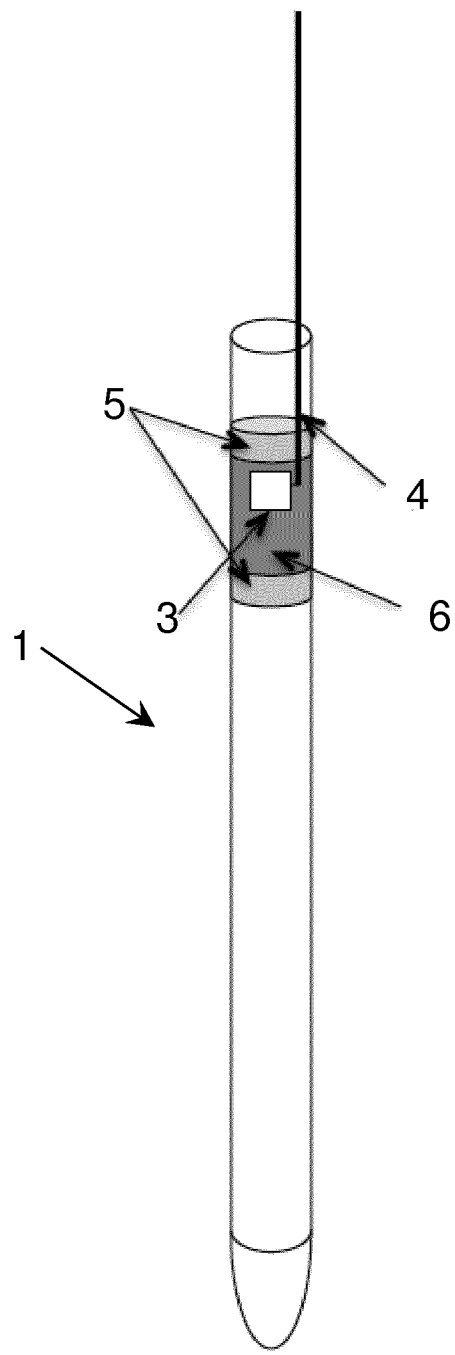
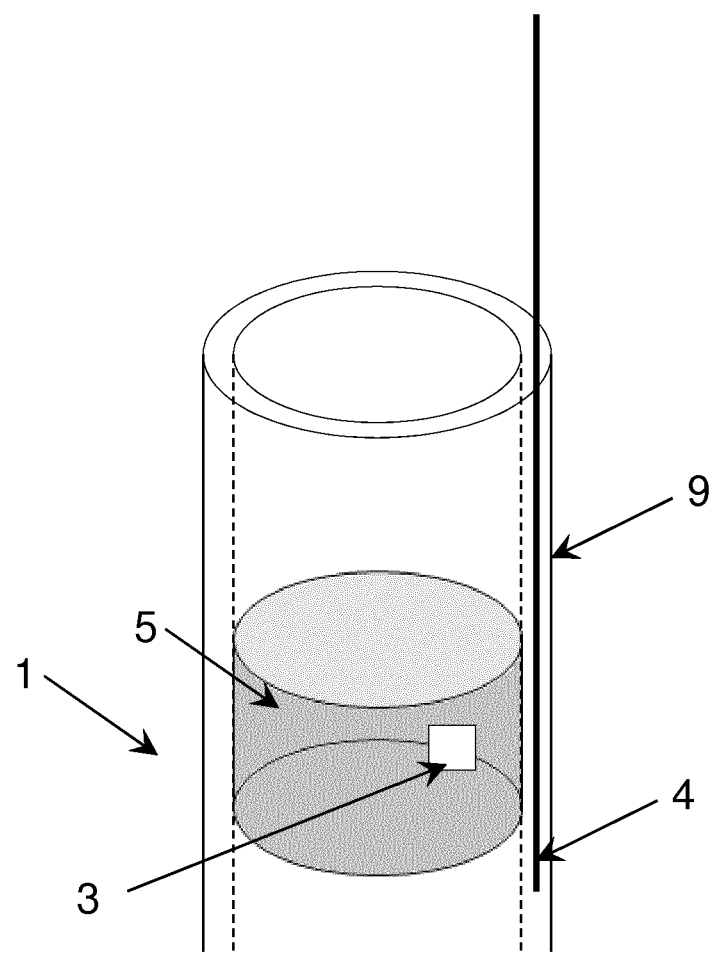
FIG. 5                    FIG. 6

RFID SYSTEM FOR IDENTIFICATION OF CRYOGENIC STRAWS

CROSS-REFERENCE TO RELATED APPLICATIONS

This application is the National Stage of International Patent Application No. PCT/EP2016/082514, filed Dec. 23, 2016, which claims priority from EP Patent Application No. 15202525.0, filed Dec. 23, 2015, the disclosures of each of which are incorporated herein by reference in their entireties for any and all purposes.

The present disclosure relates to a radio-frequency identification system for cryogenic straws and a cryogenic straw comprising a radio-frequency identification system.

BACKGROUND OF INVENTION

Preserving organic material, such as DNA material and sperm samples, requires very low storing temperatures. This has long been achieved by cryogenic freezing where the organic samples are immersed in liquid nitrogen, which has a boiling temperature of −196° C. Cryonic storage at very cold temperatures increases longevity of cells significantly. The cryogenic temperature range has been defined as from −150° C. to absolute zero −273.15° C., the temperature at which molecular motion comes as close as theoretically possible to ceasing completely. When performing an audit of samples stored at cryogenic temperatures, it is desirable to minimize the time the samples spend outside the cryogenic environment.

The biological samples may be preserved in individual plastic straws or vials, each having a unique printed ID. These vials are then bundled and immersed, typically in large quantities, in canisters filled with liquid nitrogen. Keeping track of the individual vials involves a lot of manual labor, where the vials have to be temporarily removed from the canister for registration and subsequent book keeping.

The idea of using RFID for cryogenic straws has been proposed in various forms. EP 2 743 865 proposes an RFID tag having an antenna formed by a coil wound around a ferrite core, wherein the assembly is said to fit inside a vessel having a dimension down to 1.4 mm. WO 2014/001819 also addresses the issue of introducing RFID tags for cryogenic straws. In this patent application it is suggested that a sleeve is placed around the straw in order not interfere with the positioning of the biological sample inside the straw.

The prior art document can be considered to disclose the use of RFID tags in relation to cryogenic straw generally and provide different functional solutions. However, the solutions are not optimal in terms of size, costs and operational temperature ranges.

SUMMARY OF INVENTION

The present disclosure relates to radio-frequency tagging of cryogenic straws by providing an assembly that can be integrated, such as molded or cast, in the cryogenic straw or in a sealing element inside the straw. By operating at ultra-high frequencies (UHF) (usually defined as a frequency range of between 300 MHz and 3 GHz, possibly extending to a range of between 100 MHz and 10 GHz) or very-high frequencies (VHF) (usually defined as a frequency range of between 30 MHz and 300 MHz) an antenna of the RFID tag can be designed as a thin conductive thread that can be integrated in e.g. the sidewall of a substantially tubular cryogenic straw. Therefore, in a first embodiment, the presently disclosed RFID tag may be a radio-frequency identification system for a cryogenic straw comprising:

- at least one integrated circuit configured to store information and generate a radio-frequency signal in a frequency range of between 30 MHz and 10 GHz, preferably between 300 MHz and 3 GHz and/or between 30 MHz and 300 MHz;
- at least one antenna comprising a conductive thread wherein the at least one antenna is configured to be integrated in the cryogenic straw.

In the previously known solutions operating at a low frequency e.g. 125 kHz or 13 MHz there would be a need for a coil wound around a ferrite core, which requires considerable space in relation to a thin cryogenic straw having a diameter of e.g. 2 mm. In contrast, the present invention preferable operates at ultra-high frequencies, which means that the antenna can be designed as a thin thread/rod. In a preferred embodiment the antenna is cast into the wall of the straw, which provides for a cheap, light and robust solution. Using higher frequencies has the advantage that larger bandwidth can be used, which gives a faster response as well as higher data transfer per given time unit. This enables reading of readings of IDs for a high amount of straws within a short period of time. Furthermore it has the advantage that it has a relatively long reach and that the antenna can be made thin and generally small in size. Preferably the antenna is implemented as a conductive thread/rod having a diameter of less than 0.1 mm. Alternatively the antenna may be implemented as a thin sheet or hollow rod, preferably made of a metal. The antenna may also be embodied in the shape of a thin film configured to be attached to the inside or outside of the cryogenic straw. In one embodiment the film has a thickness of less than 20 µm, more preferably less than 10 µm, even more preferably less than 5 µm. Generally, the straw/rod/film may be as thin as 10 µm or even 5 µm. Preferably, the film is made of an electrically conductive material, such as a metallic material. The film may have the shape of a hollow cylinder having a thin sidewall and an inner diameter substantially equal to the outer diameter of the straw such that is fits on the outside of the straw, alternatively an outer diameter substantially equal to the inner diameter of the straw such that is fits on the inside of the straw. As an alternative to casting the antenna into the cylindrical wall of the straw, the antenna may be placed on the inside or outside of the straw. Preferably, the antenna extends in the longitudinal direction of the straw.

The antenna may be incorporated into the cryogenic straw. In one embodiment of the presently disclosed radio-frequency identification system, the antenna extends along the cryogenic straw, such as integrated in the cryogenic straw, and protrudes upwards such that a first portion of the antenna is integrated in the cryogenic straw and a second portion protrudes upwards outside the cryogenic straw in substantially the longitudinal direction of the cryogenic straw. This solution enables a possibility that the sample can stay in the cryogenic fluid while a portion of the antenna operates above the surface of the fluid. Upwards in this context refers to a placement in which the straw is placed in a substantially vertical position i.e. having one lower and one upper end, and the antenna extends and protrudes beyond the upper end of the cryogenic straw. This embodiment has the advantage that the antenna can be designed such that it protrudes above the surface of the liquid nitrogen, which improves the conditions for receiving and transmitting radio waves. The integrated circuit may also be integrated in a sealing element configured to be sealingly engaged inside the cryogenic straw, wherein the straw is preferably sealed in the lower end. The upwardly protruding antenna may be attached or integrated in a handle or shaft, the assembly arranged such that the cryogenic straw can be placed in the cryogenic fluid such that the cryogenic straw is covered by the cryogenic fluid and the at least one antenna protrudes upwards above the surface of the cryogenic fluid.

Since the RFID tags that are available do not cover temperature ranges from cryogenic temperatures to room temperature, the present radio-frequency identification system for a cryogenic straw may operate using at least two integrated circuits. The prior art solutions are typically designed for operating at cryogenic temperatures but will not work at room temperature due to e.g. the temperature characteristics of the electronic components. In one embodiment, the presently disclosed radio-frequency identification system for a cryogenic straw comprises at least two integrated circuits configured to store information and generate a radio-frequency signal in a frequency range of between 30 MHz and 3 GHz, or between 300 MHz and 3 GHz or between 100 MHz and 10 GHz, wherein a first integrated circuit is configured to operate in a first temperature range comprising cryogenic temperatures, and wherein a second integrated circuit is configured to operate at a second temperature range comprising room temperature 20° C. Preferably, tag information, and possibly other information, is stored in several memory cells, wherein the memory cells are configured to operate at different, preferably overlapping, temperature ranges. Preferably, the first and second temperature ranges are overlapping such that the system is operational over an entire, continuous temperature range. In this embodiment, the RFID tag can be used both while it is placed in the cryogenic fluid and when taken out from the cryogenic fluid to e.g. room temperature.

The present disclosure further relates to a cryogenic straw comprising the integrated radio-frequency identification system as described, and to a system for identification of cryopreserved samples comprising: a plurality of cryogenic straws having an integrated radio-frequency identification system; an RFID interrogator unit configured to generate interrogating radio-frequency signal(s) to the cryogenic straws; an RFID reader, configured to receive and identify signals from the integrated radio-frequency identification systems of the cryogenic straws. Preferably, the cryogenic straw is adapted to be stored in a container, such as a canister or a cryogenic storage dewar, which may be filled with liquid nitrogen.

These and other aspects of the invention are set forth in the following detailed description if the invention.

DESCRIPTION OF DRAWINGS

FIG. 5 shows an embodiment of the presently disclosed radio-frequency identification system having an antenna protruding upwards.

FIG. 6 shows an embodiment of the presently disclosed radio-frequency identification system, wherein the antenna is cast into the cryogenic straw.

DEFINITIONS

Figure 1:
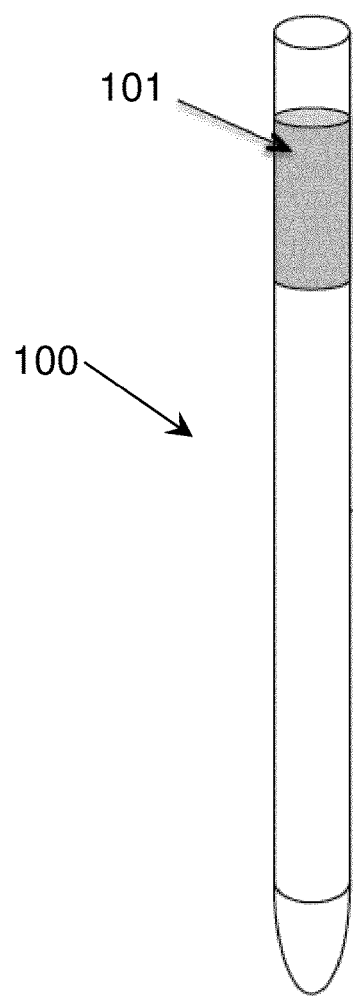
FIG. 1 shows a cryogenic straw for insemination having a sealing element.

Cryogenic refers to requiring or involving the use of very low temperatures. It is, generally, not well defined at what point on the temperature scale refrigeration ends and cryogenics begins but it is assumed that it start at approximately −150° C.

A cryogenic straw, or a cryopreservation straw, is a small storage device used for cryogenic storage of samples, typically sperm for in-vitro fertilization. Cryogenic straw in the present disclosure is used in a broad, conventional meaning for any vessel for this purpose. Typically the cryogenic straw is substantially tubular and thin in its shape.

Radio-frequency identification (RFID) refers to the wireless use of electromagnetic fields to transfer data, for the purposes of automatically identifying and tracking tags attached to objects. The tags contain electronically stored information such as an identification number or code. An RFID tag comprises a non-volatile memory and means for communicating wirelessly with an RFID reader through at least one antenna.

DETAILED DESCRIPTION OF THE INVENTION

The present disclosure relates to a radio-frequency identification system for a cryogenic straw comprising:
  at least one integrated circuit configured to store information and generate a radio-frequency signal in a frequency range of between 30 MHz and 10 GHz or between 100 MHz and 3 GHz, or between 100 MHz and 1 GHz;
  at least one antenna comprising a conductive thread, wherein the at least one antenna is configured to be integrated in the cryogenic straw or in a sealing element configured to be placed inside the cryogenic straw.

By operating in the ultra-high frequency range a very thin antenna can be used, which may be a thin conductive thread, preferably of metal, which may embedded in the straw, or, alternatively, in a sealing element that is placed inside the cryogenic straw. In one embodiment, the at least one integrated circuit and the at least one antenna is/are therefore configured to operate at 300 MHz to 3 GHz, which is also known as the decimetre band, covering e.g. 400 MHz, 800 MHz and 2.45 MHz. As stated, the range may be further extended to 100 MHz to 10 GHz. The operating frequency range may also be 300 MHz to 1 GHz, or 300 MHz to 900 MHz, or covering only the highest range 2 GHz to 3 GHz. In environments and conditions in which radio communication is possible using lower frequencies, the at least one integrated circuit and the at least one antenna may be further configured to operate at 30 MHz and 300 MHz Dimensions and Shapes of RFID System and Cryogenic Straw By operating in the ultra-high frequency range a very thin antenna may be used, which may be integrated, such as cast into, the cryogenic straw. The thickness of the antenna thread, or diameter if the thread has a substantially circular cross-section, may depend on the space that is available in the sidewall of the hollow cryogenic straw. Generally, a thicker antenna is more efficient in terms of reception and transmission, however, depending on the circumstances, a thread as thin as less than 5 µm may be working and suitable. The antenna may alternatively be implemented as thin sheet or hollow rod, preferably made of a metal. Since the total diameter of a cryogenic straw is e.g. 2 mm, a suitable width for an antenna thread placed in the sidewall of the straw may also be less than 100 µm, or less than 90 µm, or less than 50 µm, or less than 20 µm, or less than 10 µm. These embodiments are considered thinner than the existing solution operating at lower frequency.

The antenna shaped as a conductive thread may have a range of different shapes and sizes. In one embodiment, the cross section of the thread is substantially circular. The cross section may also take other shapes and may e.g. have a substantially flat shape.

The present disclosure further relates to a cryogenic straw comprising an antenna and/or the integrated radio-frequency identification system as described. One embodiment of the cryogenic straw comprises at least one antenna, the antenna comprising a conductive thread or rod, wherein the at least one antenna is integrated, such as molded, into a sidewall of the cryogenic straw. The cryogenic straw may further comprise at least one integrated circuit configured to store information and generate a radio-frequency signal in a frequency range of between 30 MHz and 3 GHz or between 100 MHz and 3 GHz. The cryogenic straw may comprise any embodiments of the presently disclosed the integrated radio-frequency identification system. As stated, the antenna of the integrated radio-frequency identification system is preferably integrated, e.g. cast into, the cryogenic straw, which provides a light and cheap solution. Several variants of the at least one antenna cast into the straw are possible. One example is shown in FIG. 6, which shows a hollow cryogenic straw 1 having a sidewall 9, in which an antenna 4 is cast. In this embodiment, the integrated circuit 3 is embedded in a sealing element 5. In this example there is no direct physical wire-connection between the integrated circuit 3 and the antenna 4, instead electromagnetic wireless communication between the integrated circuit 3 and the antenna 4 is used.

Integration of Antenna in the Cryogenic Straw

In one embodiment, the cryogenic straw is made of a polymer straw. The straw may be made of a material that is chemically inert, biocompatible and has physical characteristics that make it resistant to ultra-low temperatures and pressures created by their storage conditions, resulting in the expansion of liquids and liquid nitrogen. The at least one antenna may be entirely cast into the straw. In such a solution, in which there is not necessarily direct contact between the antenna and the integrated circuit, the at least one antenna may be connected electromagnetically, wirelessly to the at least one integrated circuit through the polymer material. The typical shape of a cryogenic straw is a substantially tubular, hollow shape comprising one closed, rounded sidewall, the at least one antenna being cast into the sidewall. The width of the sidewall can be said to determine a suitable size of an antenna that is integrated into the sidewall. In one embodiment, the antenna is completely sealed inside the sidewall of the cryogenic straw. In such a solution the integrated circuit may be embedded in for example a sealing element for sealing the straw, or any other element which can be placed permanently or temporarily in the straw. In one embodiment the integrated circuit is placed in the bottom of the straw, preferably such that it is isolated from content/samples stored in the straw. The integrated circuit may be adapted to be arranged in the bottom of the straw and/or adapted to be attached to or integrated into the straw. The integrated circuit may also be attached, or, partly or completely, incorporated into the straw.

Alternatively, there may be a physical connection between the integrated circuit and the antenna, for example through a hole in the straw, such as a hole in the sidewall of the straw.

Figure 2:
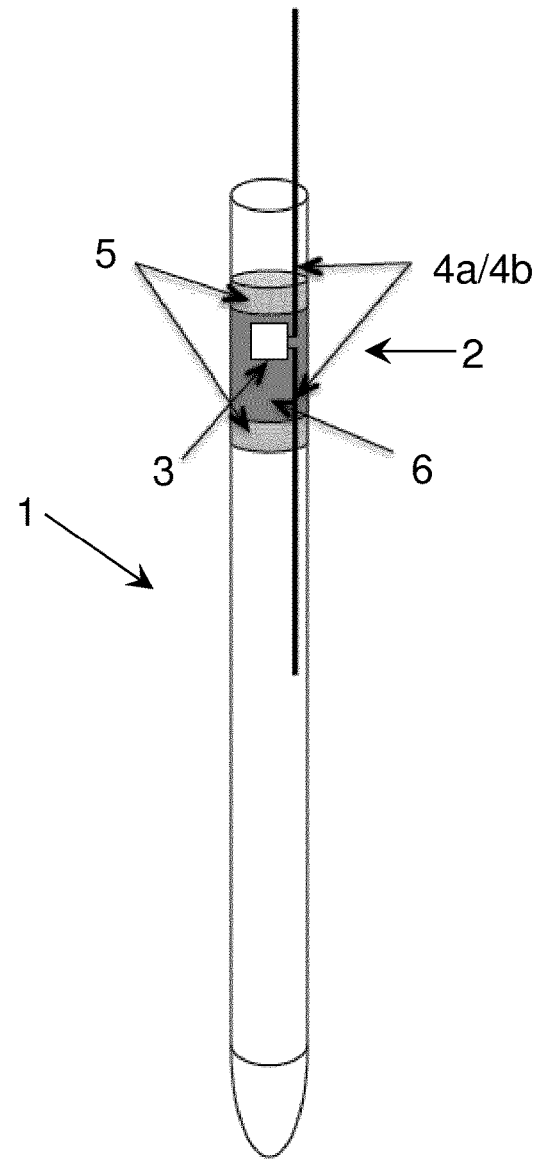
FIG. 2 shows an embodiment of the presently disclosed radio-frequency identification system in a cryogenic straw having two antenna portions, wherein one protrudes upwards.

There are many variants of cryogenic straws. One solution has a sealed lower end; in such a solution the content that is stored in the straw is placed in the straw and a sealing then seals the upper end of the straw. In one embodiment, the sealing is place inside the straw, the sealing may then be used as a plunger when the content of the straw is to be used by cutting off the lower end of the straw and moving the sealing (acting as a plunger) downwards towards the lower end of the straw, thereby emptying the straw. In this kind of solution, the at least one integrated circuit may be embedded in the sealing element. As long as the sealing is located inside the cryogenic straw, it may be in wireless connection with the antenna that is preferably cast into the sidewall of the straw. Alternatively, there may be an electrical wire, such as a metal connection, connecting the at least one antenna to the at least one integrated circuit, which then needs an opening through the sidewall to the integrated circuit. In such an embodiment, the electrical wire may be ring-shaped. In embodiments comprising a sealing element the at least one antenna may be integrated in the sealing element and protrude from the sealing element as shown in e.g. FIG. 5. The radio-frequency identification tag may also comprise two antennas wherein one extends downwards in the longitudinal direction of the straw and one extends upwards in the longitudinal direction of the straw as shown in FIG. 2.

Cryogenic straws come in a range of sizes. The presently disclosed radio-frequency identification tag may be adapted to a range of sizes of cryogenic straws such as a cryogenic straw having a length of 50 mm to 200 mm, or 30 mm to 200 mm, or 30 mm to 100 mm, or 100 mm to 150 mm, or 100 mm to 200 mm, or 50 mm to 300 mm, or 50 mm to 150 mm. As stated, a typical diameter of a cryogenic straw may be 2 mm. However, the presently disclosed radio-frequency identification tag is also suitable for cryogenic straws having a diameter of less than 10 mm, or less than 9 mm, or less than 8 mm, or less than 7 mm, or less than 6 mm, or less than 5 mm, or less than 4 mm, or less than 3 mm, or less than 2 mm, or less than 1 mm, or less than 0.5 mm. The cryogenic straw typically has a rounded sidewall, which may have a thickness of less than 2 mm, or less than 1 mm, or less than 0.5 mm, less than 0.4 mm, less than 0.3 mm, less than 0.2 mm, less than 0.1 mm.

In one embodiment, the at least one antenna is configured to be integrated in a sidewall of a substantially tubular cryogenic straw, the at least one antenna extending in a longitudinal direction of the cryogenic straw, protruding upwards. When the antenna protrudes upwards, as shown in e.g. FIG. 6, it may consequently only be partly sealed inside the sidewall of the cryogenic straw towards all sides except upwards. In this embodiment, the at least one integrated circuit may be integrated in an upper end of the cryogenic straw or in a sealing element inside the straw.

Protrusion

The part of the antenna that protrudes outside the straw may be substantially rigid and/or supported by a rigid structure outside the cryogenic straw, such as a handle or shaft of the cryogenic straw, the at least one antenna being configured such that the cryogenic straw can be placed in a cryogenic fluid, such as liquid nitrogen, wherein the cryogenic straw is covered by the cryogenic fluid and the at least one antenna protrudes upwards above the surface of the cryogenic fluid.

In an embodiment having a protruding antenna, the antenna can be said to comprise a first portion of the at least one antenna integrated in the cryogenic straw and a second portion of the at least one antenna is configured to protrude upwards outside the cryogenic straw in substantially the longitudinal direction of the cryogenic straw. Upwards may be construed as upwards in the longitudinal direction of the straw when the straw stands in a substantially vertical position in a container/bottle/canister. Preferably the length of the antenna and placement of the straw in liquid nitrogen is such that at least a part of the antenna is above the surface of the liquid nitrogen, which provides better signalling condition compared to when the antenna is completely in liquid nitrogen. The length of the first portion may be at least 5 mm, or at least 10 mm, or at least 10 mm, or at least 20 mm, or at least 30 mm, or at least 40 mm, or at least 50 mm, or at least 60 mm. The second portion, which protrudes upwards outside the straw may be at least 5 mm, or at least 10 mm, or at least 10 mm, or at least 20 mm, or at least 30 mm, or at least 40 mm, or at least 50 mm, or at least 60 mm, or at least 100 mm, or between 25 mm and 150 mm.

Temperature Ranges

In one embodiment, the presently disclosed radio-frequency identification system for cryogenic straws cover not only cryogenic temperatures but also ranges including room temperature, which may be valuable if a sample is to be identified also when it has been removed from the cryogenic liquid. The prior art solutions are typically designed for operating at cryogenic temperatures but will not work at room temperature due to e.g. the temperature characteristics of the electronic components. In one embodiment, the presently disclosed radio-frequency identification system for a cryogenic straw comprises at least two integrated circuits configured to store information and generate a radio-frequency signal in a frequency range of between 30 MHz and 10 GHz or 300 MHz and 1 GHz, wherein a first integrated circuit is configured to operate in a first temperature range comprising cryogenic temperatures, and wherein a second integrated circuit is configured to operate at a second temperature range comprising room temperature 20° C. The first and second temperature ranges may be overlapping such that the two ranges constitute one broader range.

Different approaches are possible for enabling and disabling the two systems. A simple solution is to run the two systems in parallel and either share memory cells or copy the content of the memory cells at temperatures when they both are functional. Such a solution is simple but may introduce interference. Alternatively, the system may comprise a switch for selecting which of the integrated circuits that is/are enabled. The switch may be based on a temperature sensor but could also be a command from e.g. the reading or interrogating unit. In one embodiment, the system comprises a temperature sensor for measuring a temperature surrounding and a switch configured to enable one of the integrated circuits based on the measured temperature.

Figure 7:
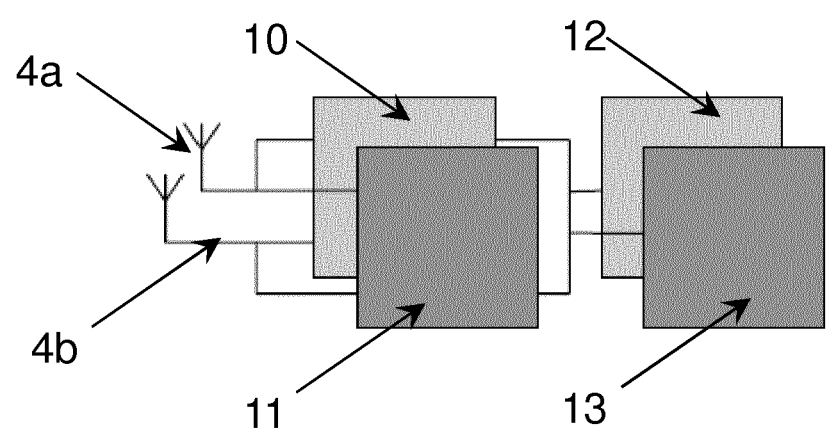
FIG. 7 shows an embodiment of the presently disclosed radio-frequency identification system having two integrated circuits operating in different temperature ranges.

FIG. 7 shows how a system covering a broader temperature range may be configured, the system having one radio-frequency identification system 10 configured for operating at a lower range and one radio-frequency identification system 11 configured for operating at a higher range. The systems may use separate memory cells 12 and 13 or share the same memory cells. In one embodiment the radio-frequency identification system has two separate antennas, wherein one is used by the first integrated circuit is associated with a first antenna and the second integrated circuit is associated with a second antenna.

Suitable temperature ranges for the two systems may depend on the actual temperature of the cryogenic liquid and the requirements of the circuit in terms of e.g. reliability, given the temperature characteristics of the circuits. In one embodiment the first integrated circuit is configured to operate below −30° C., or below −50° C., or below −70° C., or below −100° C., or below −120° C., or below −140° C., or below −160° C., or below −180° C., or below −196° C., or below −200° C., whereas the second integrated circuit is configured to operate in a range of −50° C. to 125° C., or in a range of −70° C. to 125° C., or in a range of 100° C. to 125° C., or in a range of 30° C. to 125° C. and combinations hereof. In one embodiment the first circuit operating at least below −50° C. and the second circuit operating at least over −50° C.

Powering the Radio-Frequency Identification System

The presently disclosed radio-frequency identification system does not have to be powered by a local battery. Preferably the system is powered by wireless power transfer. In one embodiment the system therefore comprises an inductive coupling, or resonant inductive coupling or capacitive coupling, or electromagnetic transfer of power. Alternatively, the system may be powered by means of a backscatter signal generated from energy from emissions of an RFID reader.

RFID Reading System

The present disclosure further relates to a system for identification of cryopreserved samples comprising:

- a plurality of cryogenic straws having an integrated radio-frequency identification system according to the invention;
- an RFID interrogator unit configured to generate interrogating radio-frequency signal(s) to the cryogenic straws; and
- an RFID reader configured to receive and identify signals from the integrated radio-frequency identification systems of the cryogenic straws.

The reading and interrogation units may be placed inside a container holding the plurality of cryogenic straws and a cryogenic liquid. The liquid may be a liquefied natural gas (LNG).

The system may further comprise a processing unit configured to demodulate and process the radio-frequency signal generated by the radio-frequency identification systems integrated in the cryogenic straws and carry out additional tasks in relation to identification of the cryogenic straws.

DETAILED DESCRIPTION OF THE DRAWINGS

The invention will in the following be described in greater detail with reference to the accompanying drawings. The drawings are exemplary and are intended to illustrate some of the features of the presently disclosed radio-frequency identification system and cryogenic insemination straw, and are not to be construed as limiting to the presently disclosed invention.

In FIGS. 2-5 it is not visible that the antenna may be cast into the sidewall of the straw. For each of these embodiments the antenna may be cast into the sidewall of the tubular straw.

FIG. 1 shows a cryogenic straw 100 for insemination without an identification system, the straw having a sealing element 101.

FIG. 2 shows an embodiment of the presently disclosed radio-frequency identification system 2 in a cryogenic straw 1 having two antenna portions 4a and 4b, wherein one (4a) protrudes upwards. In this example the integrated circuit 3 is embedded in a sealing element 5 having two parts and an electrically isolation middle medium 6.

Figure 3:
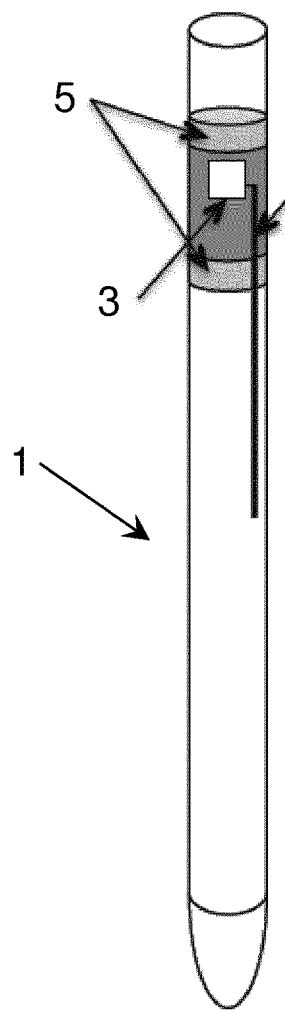
FIG. 3 shows an embodiment of the presently disclosed radio-frequency identification system and a reader coil.

FIG. 3 shows a further embodiment of the presently disclosed radio-frequency identification system 2 and a reader coil 7. In this embodiment the system 2 has one integrated circuit 3 embedded in a sealing element 5 having two parts and an electrically isolation middle medium 6, and one antenna 4 extending downwards in the longitudinal direction of the straw. As stated, the antenna 4 may be integrated, such as cast into the sidewall of the straw 1.

Figure 4:
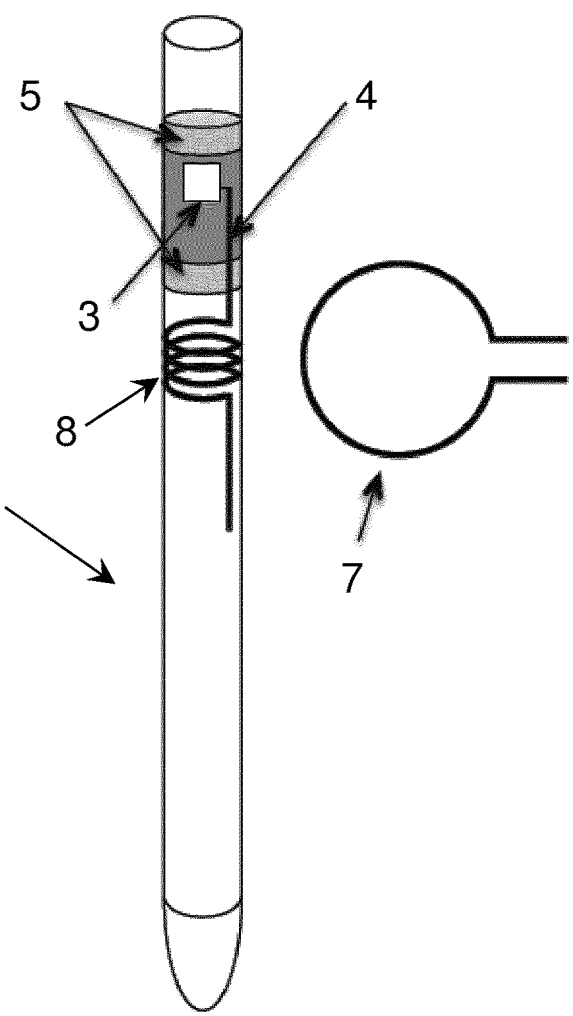
FIG. 4 shows another embodiment of the presently disclosed radio-frequency identification system and a reader coil.

FIG. 4 shows the disclosed radio-frequency identification system 2 of FIG. 3, wherein a part of antenna has the shape of an annular coil.

FIG. 5 shows the disclosed radio-frequency identification system 2 of FIG. 3 and FIG. 4, wherein the antenna 4 protrudes upwards outside the straw.

FIG. 6 shows an embodiment of the presently disclosed radio-frequency identification system 2, wherein the antenna 4 is cast into a sidewall 9 the cryogenic straw 1 In this example the integrated circuit 3 is embedded in a sealing element 5, sealingly and slidably engaging inside the straw 1. The integrated circuit 3 is connected wirelessly to the antenna 4. In the example, the antenna 4 is partly sealed inside the sidewall 9 (sealed in all directions except upwards).

FIG. 7 shows an embodiment of the presently disclosed radio-frequency identification system 2 having one radio-frequency identification system 10 configured for operating at a lower range and one radio-frequency identification system 11 configured for operating at a higher range. In the example the systems has separate memory cells 12 and 13.

Further Details of the Invention

1. A radio-frequency identification system for a cryogenic straw comprising:
   at least one integrated circuit configured to store information and generate a radio-frequency signal in a frequency range of between 100 MHz and 10 GHz or between 30 MHz and 10 GHz; and
   at least one antenna comprising a conductive thread or hollow rod, wherein the at least one antenna is configured to be integrated in the cryogenic straw or in a sealing element configured to be placed inside the cryogenic straw.

2. The radio-frequency identification system according to any of the preceding items, wherein the antenna is adapted to be incorporated, such as molded, into a sidewall of the cryogenic straw.

3. The radio-frequency identification system according to any of the preceding items, wherein the integrated circuit is adapted to be incorporated, such as molded, into the cryogenic straw, such as incorporated in the bottom of the straw or incorporated in a sidewall of the straw.

4. The radio-frequency identification system according to item 3, wherein the antenna and the integrated circuit are adapted to be connected to each other by a wire incorporated in the cryogenic straw or connected electromagnetically.

5. The radio-frequency identification system according to any of the preceding items, wherein the thickness or diameter of the conductive thread/rod is less than 100 μm, or less than 90 μm, or less than 50 μm, or less than 20 μm, or less than 10 μm, or less than 5 μm.

6. The radio-frequency identification system according to any of the preceding items, wherein the at least one integrated circuit is configured to store information and generate a radio-frequency signal in a frequency of between 300 MHz and 3 GHz, or between 300 MHz and 1 GHz, or between 300 MHz and 900 MHz, or between 2 GHz and 3 GHz, or between 350 MHz and 2.5 GHz.

7. The radio-frequency identification system according to any of the preceding items, the conductive thread/rod having a substantially circular or substantially flat cross section.

8. The radio-frequency identification system according to any of the preceding items, configured such that the at least one antenna is connected electromagnetically, wirelessly to the at least one integrated circuit.

9. The radio-frequency identification system according to any of the preceding items, further comprising an electrical wire, such as a metal connection, and configured such that said electrical wire connects the at least one antenna to the at least one integrated circuit.

10. The radio-frequency identification system according to any of the preceding items, wherein a first portion of the at least one antenna is configured to be integrated in the cryogenic straw and a second portion of the at least one antenna is configured to protrude upwards outside the cryogenic straw in substantially the longitudinal direction of the cryogenic straw.

11. The radio-frequency identification system according to item 10, wherein the length of the first portion is at least 5 mm, or at least 10 mm, or at least 10 mm, or at least 20 mm, or at least 30 mm, or at least 40 mm, or at least 50 mm, or at least 60 mm.

12. The radio-frequency identification system according to any of items 10-11, wherein the length of the second portion is at least 5 mm, or at least 10 mm, or at least 10 mm, or at least 20 mm, or at least 30 mm, or at least 40 mm, or at least 50 mm, or at least 60 mm, or at least 100 mm, or between 25 mm and 150 mm.

13. The radio-frequency identification system according to any of the preceding items, comprising at least two integrated circuits configured to store information and generate a radio-frequency signal in a frequency range of between 100 MHz and 10 GHz, wherein a first integrated circuit is configured to operate in a first temperature range comprising cryogenic temperatures, and wherein a second integrated circuit is configured to operate at a second temperature range comprising room temperature 20° C.

14. The radio-frequency identification system according to item 13, wherein the first and second temperature ranges are overlapping.

15. The radio-frequency identification system according to any of items 13-14, further comprising a temperature sensor for measuring a temperature surrounding the system and a switch configured to enable one of the integrated circuits based on the measured temperature.

16. The radio-frequency identification system according to any of the preceding items comprising two antennas, wherein one of the antennas protrudes upwards outside the cryogenic straw in substantially the longitudinal direction of the cryogenic straw.

17. The radio-frequency identification system according to item 16 comprising at least two antennas, wherein one of the antennas is connected to the first integrated circuit and the other antenna is connected to the second integrated circuit.

18. The radio-frequency identification system according to any of the preceding items, wherein the first integrated circuit is configured to operate below −30° C., or below −50° C., or below −70° C., or below −100° C., or below −120° C., or below −140° C., or below −160° C., or below −180° C., or below −196° C., or below −200° C.

19. The radio-frequency identification system according to any of the preceding items, wherein the second integrated circuit is configured to operate in a range of −50° C. to 125° C., or in a range of −70° C. to 125° C., or in a range of −100° C. to 125° C., or in a range of −30° C. to 125° C.

20. The radio-frequency identification system according to any of the preceding items, wherein the at least one antenna is configured to be integrated in a sidewall of a substantially tubular cryogenic straw, the at least one antenna extending in a longitudinal direction of the cryogenic straw, protruding upwards.

21. The radio-frequency identification system according to any of the preceding items, wherein the at least one integrated circuit is integrated in an upper end of the cryogenic straw.

22. The radio-frequency identification system according to any of the preceding items, wherein the at least one antenna is substantially rigid and/or supported by a rigid structure outside the cryogenic straw, such as a handle or shaft of the cryogenic straw, the at least one antenna being configured such that the cryogenic straw can be placed in a cryogenic fluid, such as liquid nitrogen, wherein the cryogenic straw is covered by the cryogenic fluid and the at least one antenna protrudes upwards above the surface of the cryogenic fluid.

23. The radio-frequency identification system according to any of the preceding items, wherein the system is powered by wireless power transfer.

24. The cryogenic straw according to item 23, wherein the system comprises an inductive coupling, or resonant inductive coupling or capacitive coupling.

25. The cryogenic straw according to any of the preceding items, wherein the system is powered by means of a backscatter signal generated from energy from emissions of an RFID reader.

26. A cryogenic straw comprising the integrated radio-frequency identification system according to any of the preceding items.

27. The cryogenic straw according to item 26, wherein the straw is made of a polymer material and the at least one antenna is cast into the cryogenic straw.

28. The cryogenic straw according to any of items 26-27, wherein the cryogenic straw is substantially tubular comprising one closed, rounded sidewall, the at least one antenna being cast into the sidewall.

29. The cryogenic straw according to any of items 26-28, the cryogenic straw having a substantially circular cross section.

30. The cryogenic straw according to any of items 26-29, the cryogenic straw having a length of 50 mm to 200 mm, or 30 mm to 200 mm, or 30 mm to 100 mm, or 100 mm to 150 mm, or 100 mm to 200 mm, or 50 mm to 300 mm, or 50 mm to 150 mm.

31. The cryogenic straw according to any of items 26-30, the cryogenic straw having a diameter of less than 10 mm, or less than 9 mm, or less than 8 mm, or less than 7 mm, or less than 6 mm, or less than 5 mm, or less than 4 mm, or less than 3 mm, or less than 2 mm, or less than 1 mm, or less than 0.5 mm.

32. The cryogenic straw according to any of items 26-31, wherein the rounded sidewall has a thickness of less than 2 mm, or less than 1 mm, or less than 0.5 mm, less than 0.4 mm, less than 0.3 mm, less than 0.2 mm, less than 0.1 mm.

33. The cryogenic straw according to any of items 26-32, wherein the cryogenic straw is sealed in one end.

34. The cryogenic straw according to any of items 26-33, further comprising a sealing element comprising the at least one integrated circuit, wherein the at least one antenna protrudes from the sealing element.

35. The cryogenic straw according to any of items 26-34, wherein the cryogenic straw is sealed in both ends during storage.

36. A system for identification of cryopreserved samples comprising:
  a plurality of cryogenic straws according to any of items 26-35 having an integrated radio-frequency identification system;
  an RFID interrogator unit configured to generate interrogating radio-frequency signal(s) to the cryogenic straws; and
  an RFID reader configured to receive and identify signals from the integrated radio-frequency identification systems of the cryogenic straws.

37. The system for identification of cryopreserved samples according to item 36 further comprising a processing unit configured to demodulate and process the radio-frequency signal generated by the radio-frequency identification systems integrated in the cryogenic straws.

The invention claimed is:

1. A radio-frequency identification system comprising:
  an RFID interrogator unit;
  an RFID tag system for use with the RFID interrogator unit, the RFID tag system comprising;
    a cryogenic straw;
    at least one RFID tag integrated circuit configured to be disposed within the cryogenic straw, wherein the at least one integrated circuit is configured to store information and generate a radio-frequency signal in a frequency range of between 30 MHz and 3 GHz; and
    at least one RFID tag antenna comprising a conductive thread, wherein the at least one RFID tag antenna is integrated into a sidewall of the cryogenic straw, and wherein the at least one RFID tag antenna is configured to communicate wirelessly with the at least one RFID tag integrated circuit when the at least one integrated circuit is disposed within the cryogenic straw,
    wherein the cryogenic straw further comprises a seal sealingly and slidably engaging inside the cryogenic straw, and wherein the RFID tag integrated circuit is embedded in the seal.

2. The radio-frequency identification system according to claim 1, wherein a first portion of the at least one RFID tag antenna is integrated in the sidewall of the cryogenic straw and a second portion of the at least one RFID tag antenna protrudes upwards outside the cryogenic straw in the longitudinal direction of the cryogenic straw.

3. The radio-frequency identification system according to claim 1, wherein the at least one RFID tag integrated circuit is configured to and generate a radio-frequency signal in a frequency range of between 300 MHz and 1 GHz.

4. The radio-frequency identification system according to claim 1, wherein the thickness or diameter of the conductive thread is less than 100 μm.

5. The radio-frequency identification system according to claim 1, wherein the at least one RFID tag integrated circuit comprises at least two RFID tag integrated circuits configured to store information and each disposed within the cryogenic straw, wherein a first RFID tag integrated circuit of the at least two RFID tag integrated circuits is configured to operate in a first temperature range comprising cryogenic temperatures, and wherein a second RFID tag integrated circuit of the at least two RFID tag integrated circuits is configured to operate at a second temperature range comprising room temperature 20° C.

6. The radio-frequency identification system according to claim 5, wherein the first and second temperature ranges are overlapping.

7. The radio-frequency identification system according to claim 5, further comprising a temperature sensor for measuring a temperature surrounding the RFID tag system and a switch configured to enable one of the at least two RFID tag integrated circuits based on the measured temperature.

8. The radio-frequency identification system according to claim 7, wherein the first RFID tag integrated circuit is configured to operate at least below −50° C., and wherein the second RFID tag integrated circuit is configured to operate at least in a range of −50° C. to 125° C.

9. The radio-frequency identification system according to claim 1, wherein the cryogenic straw is tubular, and wherein the at least one RFID tag antenna extends in a longitudinal direction of the cryogenic straw, protruding upwards.

10. The radio-frequency identification system according to claim 1, wherein the at least one RFID tag antenna is rigid or supported by a rigid structure outside the cryogenic straw, the at least one RFID tag antenna being configured such that the cryogenic straw can be placed in a cryogenic fluid, wherein the cryogenic straw is covered by the cryogenic fluid and the at least one RFID tag antenna protrudes upwards above a surface of the cryogenic fluid.

11. The radio-frequency identification system according to claim 10, wherein the cryogenic fluid is liquid nitrogen.

12. The radio-frequency identification system according to claim 1, wherein said at least one RFID tag antenna is configured to be molded into the sidewall of the cryogenic straw.

13. The radio-frequency identification system according to claim 1, wherein a thickness or diameter of the conductive thread is less than 90 pm.

14. The radio-frequency identification system according to claim 1, wherein a thickness or diameter of the conductive thread is less than 50 pm.

15. The radio-frequency identification system according to claim 1, wherein a thickness or diameter of the conductive thread is less than 20 pm.

16. The radio-frequency identification system according to claim 1, wherein a thickness or diameter of the conductive thread is less than 10 pm.

17. The radio-frequency identification system according to claim 1, wherein a thickness or diameter of the conductive thread is less than 5 m.

* * * * *